BEST AVAILABLE COPY

CHARLES PADDOCK.

Improvement in Thimble Skeins.

No. 4,791.

Reissued March 5, 1872.

Witnesses:

Chas. Nida

Geo. W. Mabee

Inventor:

C. Paddock

Per Munn & Co

Attorneys.

AM. PHOTO-LITHOGRAPHIC CO. N.Y. (OSBORNE'S PROCESS.)

UNITED STATES PATENT OFFICE.

CHARLES PADDOCK, OF ALTON, ILLINOIS.

IMPROVEMENT IN THIMBLE-SKEINS.

Specification forming part of Letters Patent No. 120,092, dated October 17, 1871; reissue No. 4,791, dated March 5, 1872.

Specification describing a new and useful Improvement in Thimble-Skeins, invented by CHARLES PADDOCK, of Alton, in the county of Madison and State of Illinois.

My invention consists of an octagonal washer, together with an octagonal shoulder upon the end of the skein to which the washer is fitted. By means of this device the thimble and nut at end of the skein are separated by a washer which cannot revolve, and which is, as it were, a part of the skein itself.

Figure 1:
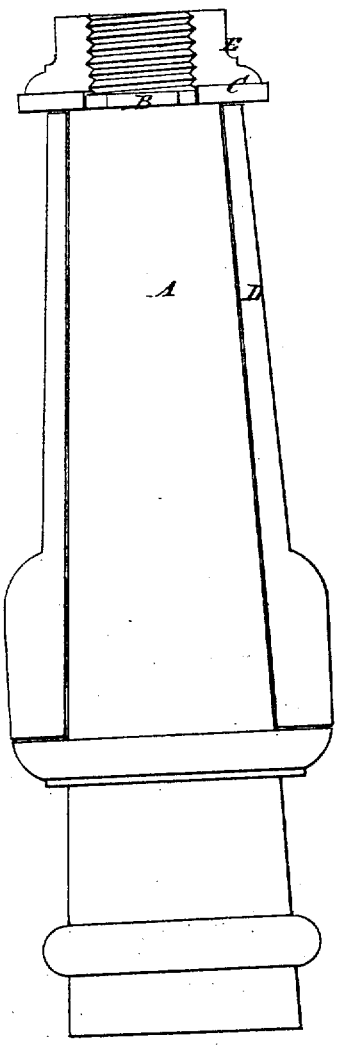
Figure 2:
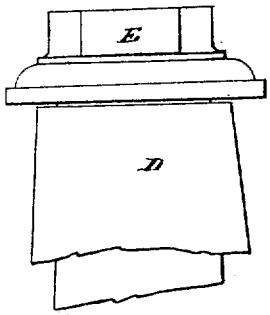
Figure 3:
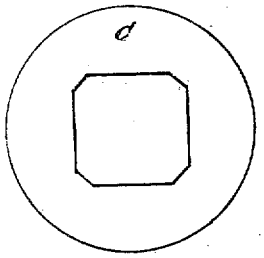
Figure 4:
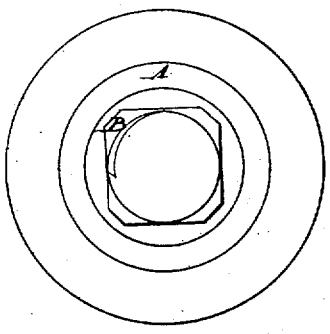

In the accompanying drawing, Figure 1 is a sectional view of the thimble, nut, and washer, in position with reference to the skein. Fig. 2 is an exterior view of the same. Fig. 3 is a top view of the octagonal washer. Fig. 4 is a top view of the octagonal shoulder upon the skein.

Similar letters of reference indicate corresponding parts.

A is the skein; B is the octagonal shoulder upon the same; C is the octagonal washer; D is the thimble; E is the nut. Any other angular form of the shoulder and washer will accomplish the object as well. The washer C being fitted over the octagonal shoulder B upon the skein, the washer is immovably fixed thereto.

The revolving of the thimble D upon the skein A, because of the interposition of the octagonal washer C can impart no jarring or loosening motion to the nut E. The prevention of this loosening of the nut, obviously of great importance, is, it is apparent, effectually accomplished by my invention, which has this result for its object.

Having thus described my invention, I claim as new and desire to secure by Letters Patent—

A washer, C, of an angular form, combined with the skein A having a correspondingly-angled shoulder, B, as described, so that the washer being applied before the nut a lock will be formed.

CHARLES PADDOCK.

Witnesses:

JONATHAN QUARTON,
HENRY SIEN.